(12) United States Patent
Saito

(10) Patent No.: US 10,620,588 B2
(45) Date of Patent: Apr. 14, 2020

(54) STEPPING MOTOR, ROTATION DETECTING APPARATUS, AND ELECTRONIC TIMEPIECE

(71) Applicant: CASIO COMPUTER CO., LTD., Tokyo (JP)

(72) Inventor: Yuta Saito, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 283 days.

(21) Appl. No.: 15/667,370

(22) Filed: Aug. 2, 2017

(65) Prior Publication Data
US 2018/0088533 A1    Mar. 29, 2018

(30) Foreign Application Priority Data

Sep. 26, 2016    (JP) .................................. 2016-187058

(51) Int. Cl.
*G04C 3/14* (2006.01)
*H02P 8/34* (2006.01)
(Continued)

(52) U.S. Cl.
CPC ............... *G04C 3/143* (2013.01); *G04C 3/14* (2013.01); *H02P 8/02* (2013.01); *H02P 8/16* (2013.01); *H02P 8/34* (2013.01); *H02P 8/38* (2013.01)

(58) Field of Classification Search
CPC .. G04C 3/143; G04C 3/14; H02P 8/02; H02P 8/16; H02P 8/34; H02P 8/38
See application file for complete search history.

(56) References Cited

U.S. PATENT DOCUMENTS

| 4,312,059 A | 1/1982 | Mandai et al. |
| 4,326,278 A | 4/1982 | Shida et al. |

(Continued)

FOREIGN PATENT DOCUMENTS

| CN | 1190755 A | 8/1998 |
| CN | 1745344 A | 3/2006 |

(Continued)

OTHER PUBLICATIONS

Chinese Office Action dated Feb. 19, 2019, in a counterpart Chinese patent application 201710174231.8. (Cited in the related U.S. Appl. No. 15/460,651 and a machine translation (not reviewed for accuracy) attached.).

(Continued)

*Primary Examiner* — Sean Kayes
(74) *Attorney, Agent, or Firm* — Chen Yoshimura LLP

(57) ABSTRACT

A stepping motor includes: a rotor; and a stator including an opening accommodating the rotor, a first side yoke extending from the opening in a first direction, a second side yoke extending from the opening in a second direction that is a direction opposite to the first direction, and one or a plurality of coils magnetically coupled to the first side yoke or the second side yoke. Assuming a direction orthogonal to the first direction and the second direction is defined as a third direction, a first recess is formed in an outer circumference of the stator at a position rotated from the third direction toward the second direction by a prescribed first angle and a second recess that determines a stable resting position of the rotor is formed at a position rotated from the second direction toward the third direction by a prescribed second angle.

15 Claims, 10 Drawing Sheets

(51) Int. Cl.
*H02P 8/02* (2006.01)
*H02P 8/16* (2006.01)
*H02P 8/38* (2006.01)

(56) References Cited

U.S. PATENT DOCUMENTS

| | | |
|---|---|---|
| 5,973,469 A | 10/1999 | Higuchi et al. |
| 6,108,279 A | 8/2000 | Hara |
| 2006/0186853 A1 | 8/2006 | Brummack et al. |
| 2011/0080132 A1 | 4/2011 | Ogasawara et al. |
| 2015/0085625 A1* | 3/2015 | Saito .................. H02K 37/16 |
| | | 368/155 |
| 2015/0092522 A1* | 4/2015 | Saito .................. H02K 21/185 |
| | | 368/80 |
| 2017/0277130 A1 | 9/2017 | Saito |
| 2017/0277131 A1 | 9/2017 | Saito et al. |

FOREIGN PATENT DOCUMENTS

| | | |
|---|---|---|
| CN | 102035450 A | 4/2011 |
| CN | 104467345 A | 3/2015 |
| CN | 104518636 A | 4/2015 |
| JP | S61-15380 B2 | 4/1986 |
| JP | H9-266697 A | 10/1997 |

OTHER PUBLICATIONS

Ohinese Office Action dated Mar. 18, 2019, in a counterpart Chinese patent application 201710685625.X. (A machine translation (not reviewed for accuracy) attached.).
U.S. Appl. No. 16/506,955, filed Jul. 9, 2019.

\* cited by examiner

First Driving Phase

Second Driving Phase/Charge Phase

Third Driving Phase

Current Detection Phase

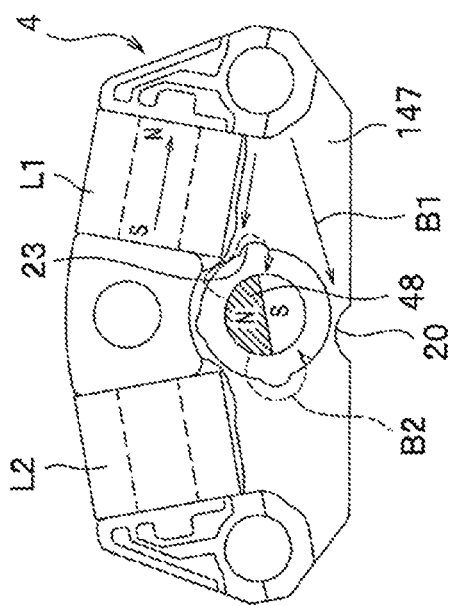
FIG. 6C
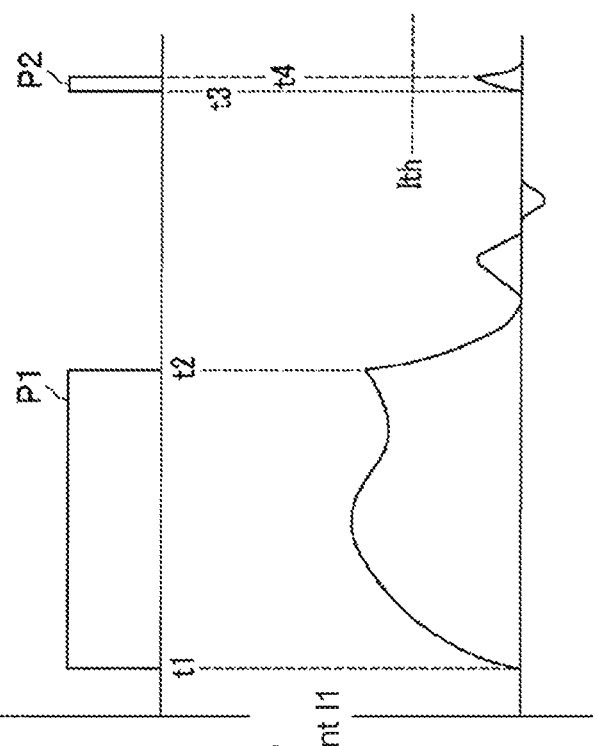
FIG. 6A Successful Rotation Coil Voltage V1
FIG. 6B Coil Current I1

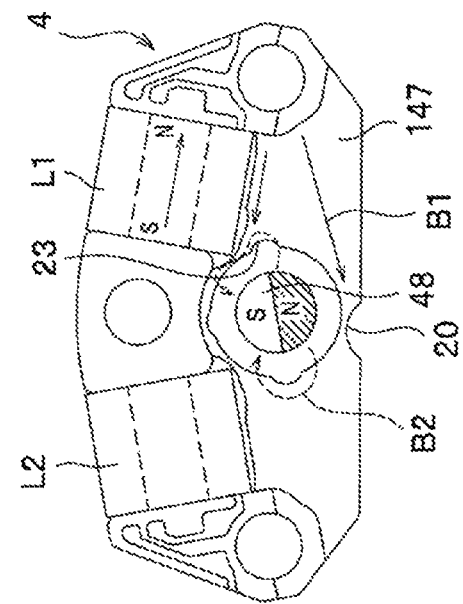
FIG. 7A
Coil Voltage V1
Unsuccessful Rotation
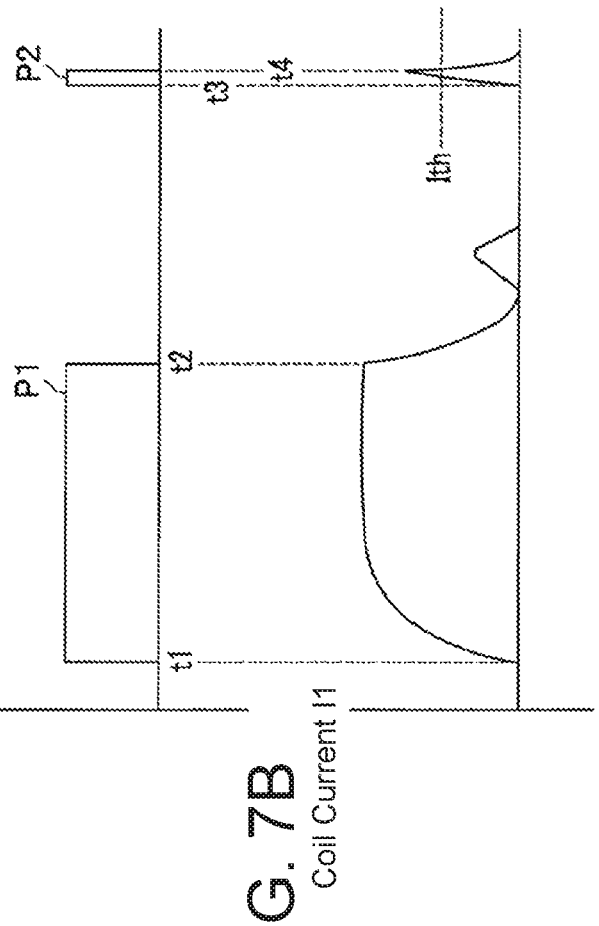
FIG. 7B
Coil Current I1
FIG. 7C

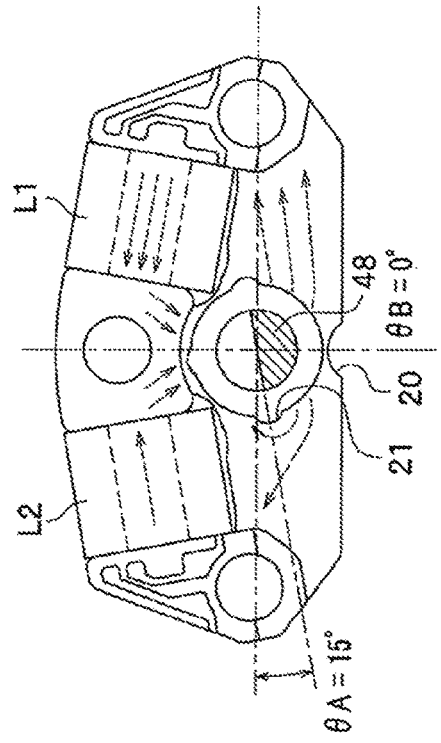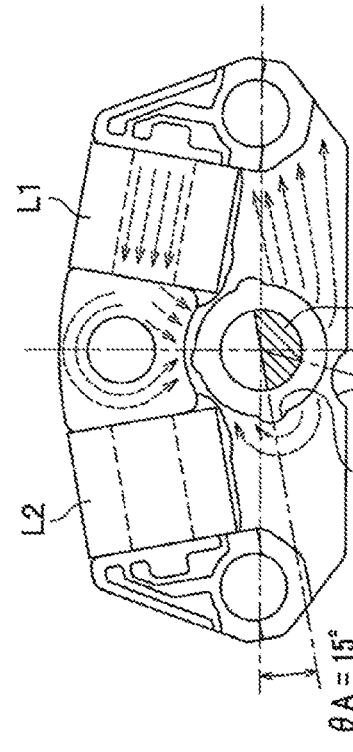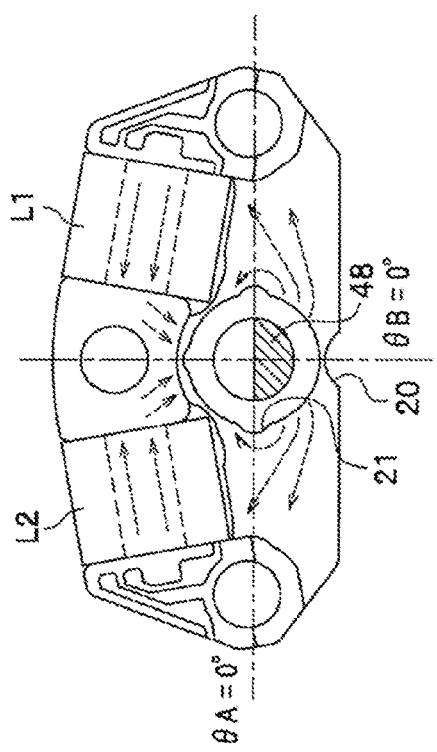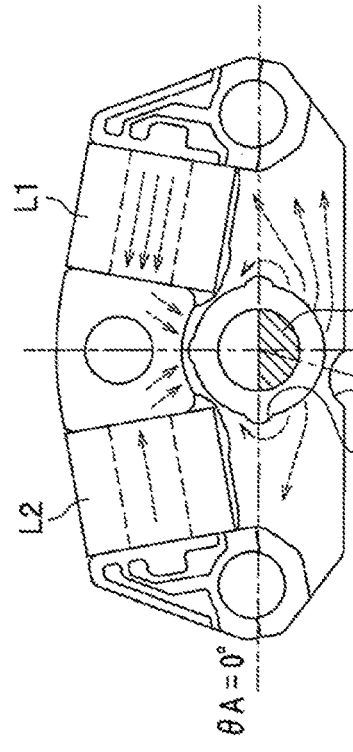

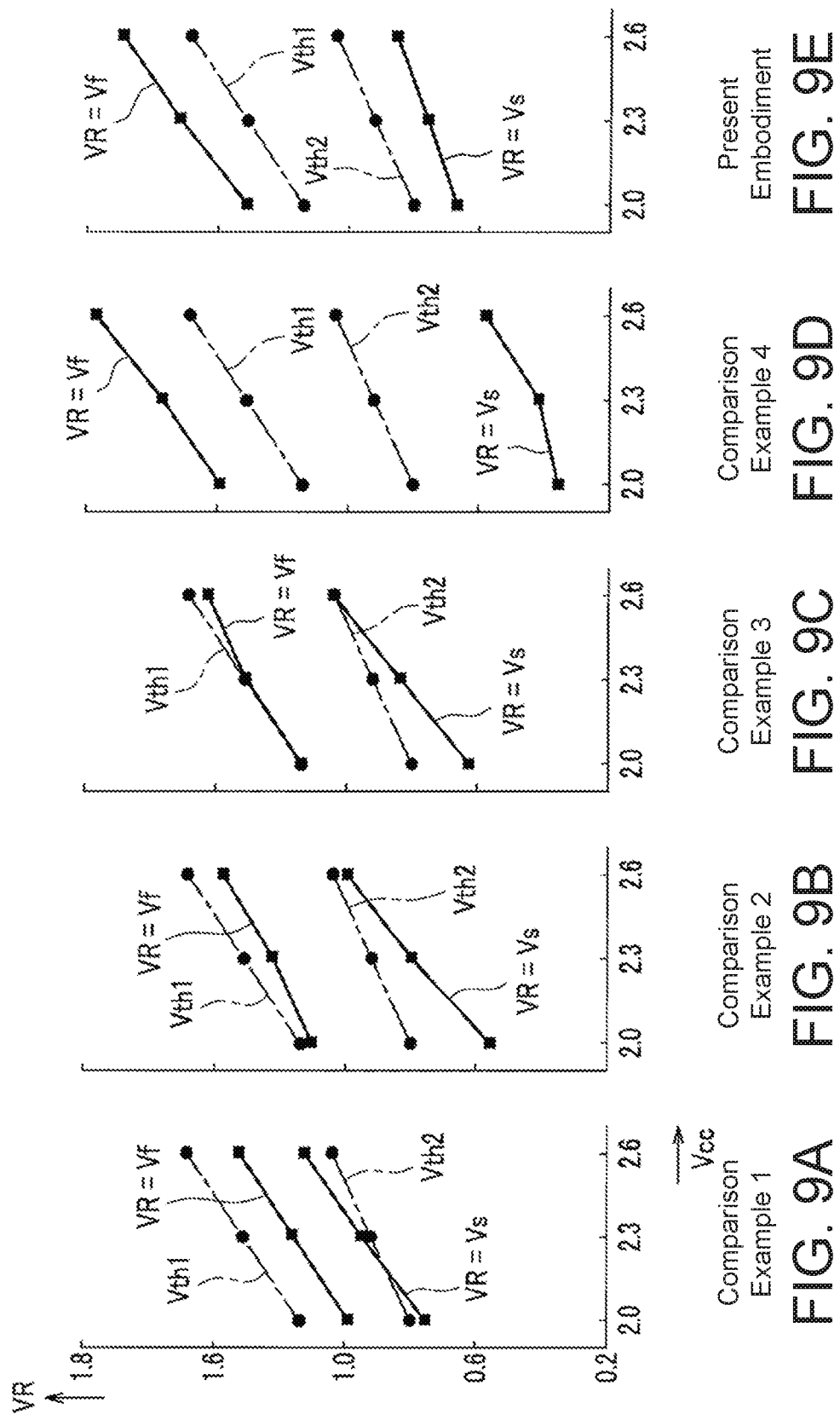

STEPPING MOTOR, ROTATION DETECTING APPARATUS, AND ELECTRONIC TIMEPIECE

BACKGROUND OF THE INVENTION

The present invention relates to a stepping motor, a rotation detecting apparatus, and an electronic clock.

BACKGROUND ART

In a stepping motor, it is necessary for the rotor to rotate reliably at each step. Thus, in driving control of a stepping motor, it is determined whether or not the rotor has rotated (rotor rotation detection). A method of detecting back EMF (back-voltage) arising in the coil is known as a method for such detection. Specifically, this method detects back EMF produced by damping when, after a driving pulse has been applied to rotate the rotor, the rotor is stopped at a prescribed step angle. In the case where it has been determined that the rotor has not rotated, a correction pulse is further applied to rotate the rotor.

However, "damping" of the rotor refers to transforming the kinetic energy of the rotor into Joule heat, and thus in a certain sense is a wasteful consumption of power. There are known techniques that accordingly reduce the speed of the rotor near a step angle in order to reduce energy loss caused by damping. For example, the solution in the abstract of Japanese Patent Application Laid-Open Publication No. H9-266697, indicated below, discloses the following: "A driving pulse supplied to a step motor is subjected to chopper control such that the duty ratio of driving pulses is set to be lower in an initial stage and a final stage than in a middle stage. This makes it possible to set an effective power distribution of the driving pulses to be lower in the initial stage and the final stage and higher in the middle stage, causing the step motor to produce a torque matching the cogging torque of the step motor. The rotor is rotated at a low speed while eliminating wasteful power consumption in the initial stage and final stage of the driving pulses, which makes it possible to reduce the amount of power consumed to drive the step motor."

However, the level of the back EMF arising in the coil is proportional to the rotation speed of the rotor. Thus, there is a problem that if the speed of the rotor is reduced near the step angle as described above, the level of the back EMF will also drop near the step angle, resulting in a drop in the accuracy of rotation detection.

A technique that uses a magnetic saturation phenomenon arising in a stator core, such as that disclosed in Japanese Examined Patent Application No. S61-15380, for example, is known as a technique for realizing accurate rotation detection while suppressing the speed of the rotor. That is, if a magnetic flux produced by the magnet and a magnetic flux produced by the coil are in a mutually-strengthening relationship, magnetic saturation of the core will have an increased effect, and the inductance of the coil will drop. On the other hand, if the magnetic flux produced by the magnet and the magnetic flux produced by the coil are in a mutually-weakening relationship, the magnetic saturation will have a reduced effect, and the inductance of the coil will rise.

Japanese Examined Patent Application No. S61-15380 discloses a technique for determining whether rotation has succeeded or failed by applying a detection pulse to the coil and measuring the waveform of current flowing in the coil.

SUMMARY OF THE INVENTION

However, FIG. 11 in Japanese Examined Patent Application No. S61-15380 denotes the pulsewidth of the detection pulse as being 1.0 msec. The configuration disclosed in the Japanese application is thought to actually require a pulsewidth around that length for the purpose of rotation detection, and thus a large amount of power will inevitably be consumed. This defeats the original purpose of suppressing the rotation speed of the rotor to suppress the power consumption.

Having been achieved in light of the above-described circumstances, it is an object of this invention to provide a stepping motor, a rotation detecting apparatus, and an electronic timepiece capable of accurately detecting rotation of a rotor while suppressing power consumption. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a stepping motor, including: a rotor; and a stator including a generally circular-shaped opening accommodating the rotor, a first side yoke extending from the opening generally in a right horizontal direction, a second side yoke extending from the opening generally in a left horizontal direction that is a direction opposite to the right horizontal direction, and one or a plurality of coils magnetically coupled to the first side yoke or the second side yoke, the stator having a generally line-symmetrical shape with respect to a vertical line passing a center of the opening, wherein, a first recess is formed in an outer bottom edge of the stator at a position that is angularly offset from the vertical line to the left by a prescribed first angle, and wherein an inner circumference of the stator that defines the opening in the stator has a second recess that determines a stable resting position of the rotor at a position that is angularly offset downwardly by a prescribed second angle from a horizontal line passing through the center of the opening perpendicularly to the vertical line.

In another aspect, the present disclosure provides a rotation detecting apparatus, including: the stepping motor according to the above-mentioned aspect; and a motor controller that detects a value of current flowing in at least one of the one or plurality of coils of the stepping motor and determines whether or not the rotor has rotated to a target rotational position, wherein the motor controller: outputs a detection pulse to the at least one of the one or plurality of coils for detecting the value of the current flowing in the at least one of the one or plurality of coils, the value of the current depending upon a stopping angle of the rotor, detects the value of the current flowing in the one of the one or plurality of coils that is generated in response to the detection pulse, and determines whether or not the rotor has rotated to the target rotational position in accordance with the detected value of the current flowing in the at least one of the one or plurality of coils.

In another aspect, the present disclosure provides an electronic timepiece, including: the stepping motor according to the above-mentioned aspect; a hand; a timing unit that measures time; and a controller that controls driving of the stepping motor to cause the time measured by the timing unit to be specified to the hand.

In another aspect, the present disclosure provides a stepping motor, including: a rotor; and a stator including a generally circular-shaped opening accommodating the rotor, a first side yoke extending from the opening generally in a right horizontal direction, a second side yoke extending from the opening generally in a left horizontal direction that is a direction opposite to the right horizontal direction, and a pair of coils magnetically coupled to the first side yoke and the second side yoke, respectively, the stator having a generally line-symmetrical shape with respect to a vertical line passing a center of the opening, wherein, a first recess is formed in an outer bottom edge of the stator at a position intersecting the vertical line, wherein an inner circumference of the stator that defines the opening in the stator has a second recess that determines a stable resting position of the rotor, and wherein the first side yoke has a recess on an upper edge of the first side yoke at a location between the rotor and the coil magnetically coupled to the first side yoke, while the second side yoke does not have a corresponding recess or has a corresponding recess of a smaller size so as to provide for an angled magnetic saturation position relative to the vertical line.

It is to be understood that both the foregoing general description and the following detailed description are exemplary and explanatory, and are intended to provide further explanation of the invention as claimed.

BRIEF DESCRIPTION OF THE DRAWINGS

FIG. 6A is a waveform diagram illustrating a coil voltage.

FIG. 6B is a waveform diagram illustrating a coil current.

FIG. 6C is a plan view of a stepping motor when rotation is successful.

FIG. 7A is a waveform diagram illustrating a coil voltage.

FIG. 7B is a waveform diagram illustrating a coil current.

FIG. 7C is a plan view of a stepping motor when rotation fails.

FIG. 8A is a plan view of a stepping motor in Comparison Example 1.

FIG. 8B is a plan view of a stepping motor in Comparison Example 2.

FIG. 8C is a plan view of a stepping motor in Comparison Example 3.

FIG. 8D is a plan view of a stepping motor in Comparison Example 4.

FIG. 9A is a graph illustrating characteristics of measured voltages according to Comparison Example 1.

FIG. 9B is a graph illustrating characteristics of measured voltages according to Comparison Example 2.

FIG. 9C is a graph illustrating characteristics of measured voltages according to Comparison Example 3.

FIG. 9D is a graph illustrating characteristics of measured voltages according to Comparison Example 4.

FIG. 9E is a graph illustrating characteristics of measured voltages according to an embodiment of the present invention.

DETAILED DESCRIPTION OF EMBODIMENTS

Configuration of Embodiment (Overall Configuration)

Hereinafter, embodiments of the present invention will be described in detail with reference to the drawings.

Figure 1:
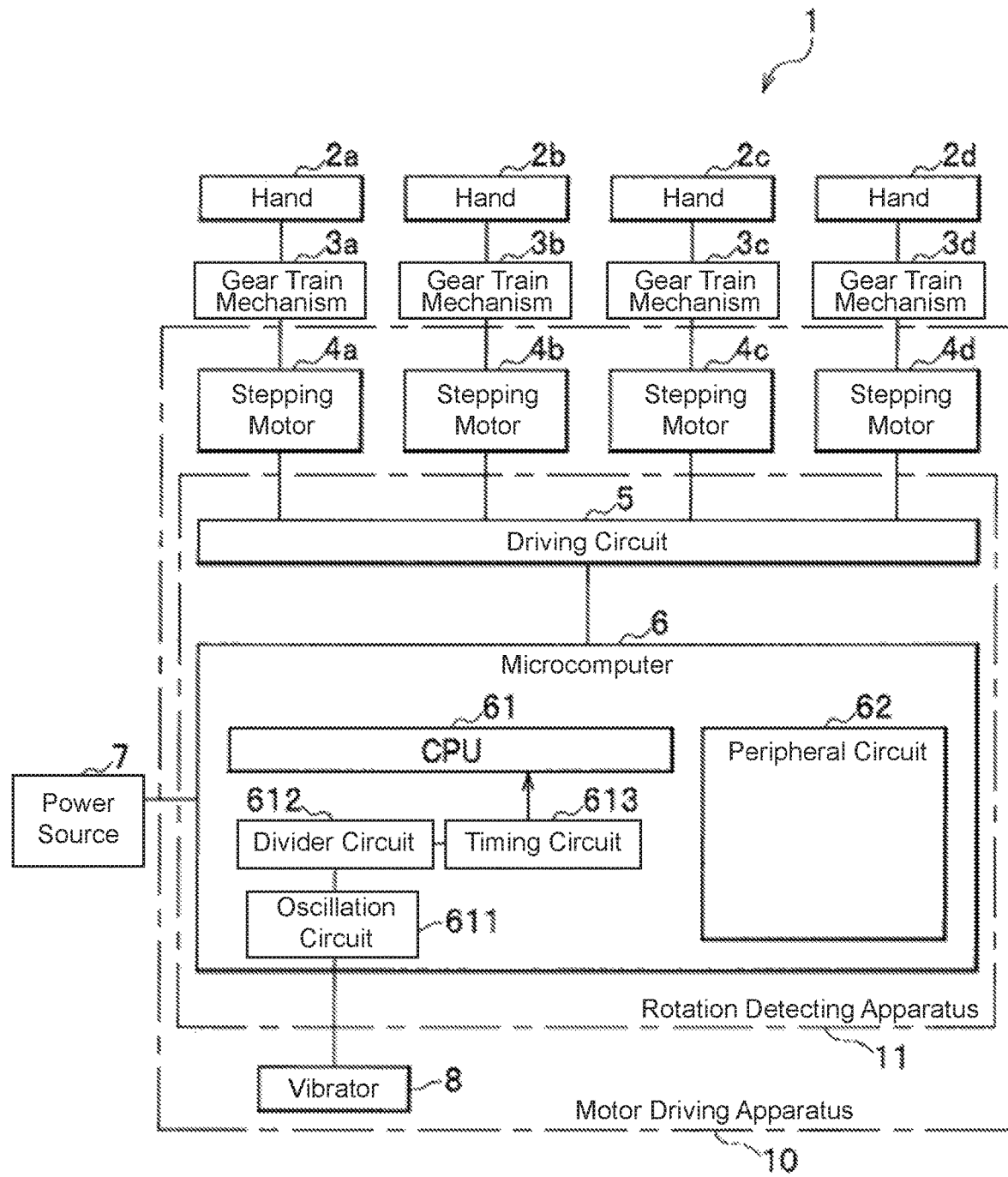
FIG. 1 is a block diagram illustrating an overview of an electronic timepiece according to an embodiment of the present invention.

FIG. 1 is a block diagram illustrating an overview of an electronic timepiece 1 according to an embodiment of the present invention.

The analog electronic timepiece 1 according to the present embodiment is capable of driving four hands 2a to 2d (display portions) using independent motors. The electronic timepiece is a wristwatch-type electronic timepiece including a band for securing the timepiece to an arm, for example, but is not limited to this in particular. The electronic timepiece 1 includes, for example, the hands 2a to 2d, and stepping motors 4a to 4d (stepping motors) that rotationally drive corresponding hands 2a to 2d via corresponding gear train mechanisms 3a to 3d (display portions). The electronic timepiece 1 further includes a driving circuit 5 that drives the stepping motors 4a to 4d, a microcomputer 6, a power source 7, and a vibrator 8.

The hands 2a to 2d will simply be referred to as hands 2 when no particular distinction needs to be made among them. Likewise, the gear train mechanisms 3a to 3d will simply be referred to as gear train mechanisms 3 when no particular distinction needs to be made among them. Furthermore, the stepping motors 4a to 4d will simply be referred to as stepping motors 4 when no particular distinction needs to be made between them.

A part including the stepping motors 4, the driving circuit 5, the microcomputer 6 (a controller), and the vibrator 8 will be called a "motor driving apparatus 10." Additionally, because the microcomputer 6 and the driving circuit 5 have a function for detecting whether or not the stepping motors 4 have rotated correctly, the driving circuit 5 and the microcomputer 6 will be called a "rotation detecting apparatus 11."

The driving circuit 5 has a bridge circuit that drives the stepping motors 4, and applies voltages to the stepping motors 4 in response to commands from the microcomputer 6. The microcomputer 6 is a large-scale integration (LSI) chip, and includes a central processing unit (CPU) 61, a peripheral circuit 62, an oscillation circuit 611, a divider circuit 612, and a timing circuit 613 (a timing unit).

The hands 2a to 2d are provided so as to be capable of rotating around a rotation axis on a face plate. The gear train mechanisms 3a to 3d cause the corresponding hands 2a to 2d to rotate. At appropriate timings, the driving circuit 5 outputs driving voltage signals for driving the stepping motors 4a to 4d on the basis of control signals inputted from the microcomputer 6. The driving circuit 5 can adjust and output the driving voltages, driving voltage pulse widths, and so on of the stepping motors 4 on the basis of setting signals from the microcomputer 6. The driving circuit 5 can output driving voltage signals to cause the stepping motors 4 to rotate forward or reverse.

The CPU 61 controls the overall operations of the electronic timepiece 1 by carrying out various types of computational processes. The CPU 61 reads out and executes control programs to cause units to continuously carry out operations related to displaying the time, and to cause units to carry out operations in real time or at specified timings on the basis of operational inputs made to an operation unit (not illustrated). The CPU 61 is a control unit that sets target positions to which the hands 2 are to move and controls the driving of the stepping motors 4 through the driving circuit 5.

The oscillation circuit 611 generates a unique frequency signal and outputs the signal to the divider circuit 612. A circuit that oscillates when combined with the vibrator 8, which is a crystal or the like, is used as the oscillation circuit 611, for example. The divider circuit 612 divides the signal inputted from the oscillation circuit 611 into various frequency signals used by the CPU 61, the timing circuit 613, and so on, and outputs the resulting signals. The timing circuit 613 is a counter circuit that counts the number of a prescribed frequency signal inputted from the divider circuit 612 and adds the obtained number to an initial time so as to measure the current time. The current time measured by the timing circuit 613 is read out by the CPU 61 and used to display the time. This time measurement may be controlled by software.

The power source 7 is configured to be capable of continuously and stably operating the electronic timepiece 1 for long periods of time, and is a combination of a battery and a DC-DC converter, for example. This ensures that an output voltage of the power source 7 stays at a prescribed value during operation.

Figure 2:
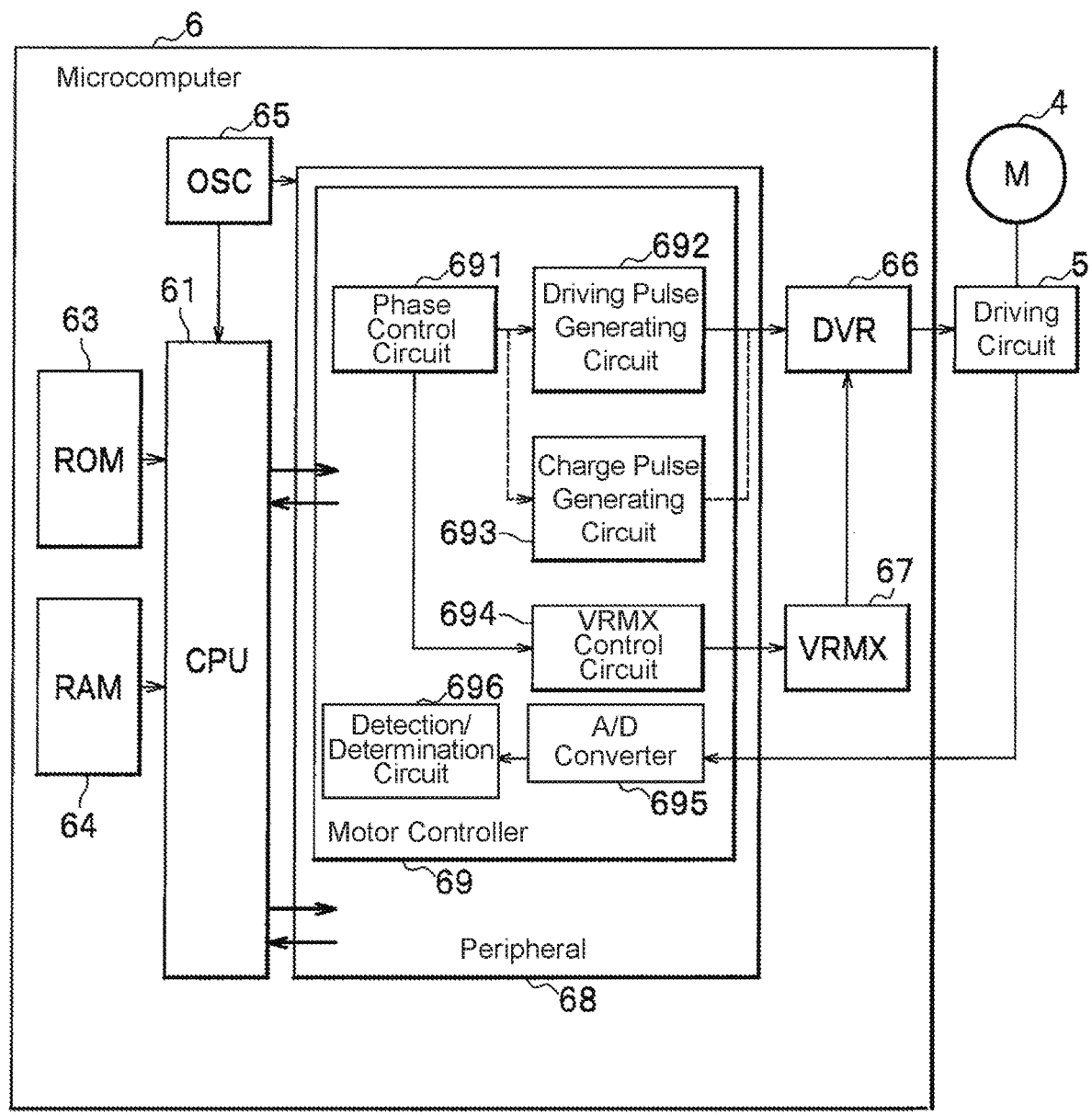
FIG. 2 is a block diagram illustrating an overview of a microcomputer.

FIG. 2 is a block diagram illustrating an overview of the microcomputer 6, which is an LSI chip. The microcomputer 6 includes the CPU 61, read-only memory (ROM) 63, random access memory (RAM) 64, an oscillator (OSC) 65, a peripheral 68, a VRMX 67, and a DVR 66. The ROM 63 stores various control programs, default setting data, and so on. The various control programs (not illustrated) are read out and continuously executed by the CPU 61 when the electronic timepiece 1 is started.

The RAM 64 is volatile memory such as SRAM or DRAM, and provides a working memory space for the CPU 61. Additionally, user setting data and the like, set on the basis of operational inputs made to the operation unit, can also be temporarily stored in the RAM 64. Part of the RAM 64 may be non-volatile memory such as flash memory or Electrically Erasable and Programmable Rear-Only Memory (EEPROM). The OSC 65 generates a unique frequency signal and supplies the signal to the CPU 61, the peripheral 68, and so on, and corresponds to a combination of the oscillation circuit 611 and the vibrator 8 illustrated in FIG. 1.

The DVR 66 is a circuit that drives signals for driving the motor. The VRMX 67 is a regulator that generates power to supply to the DVR 66. The peripheral 68 includes a motor controller 69. The motor controller 69 includes a phase control circuit 691, a driving pulse generating circuit 692, a charge pulse generating circuit 693, a VRMX control circuit 694, an A/D converter 695, and a detection/determination circuit 696. Note that the phase control circuit 691, the driving pulse generating circuit 692, the charge pulse generating circuit 693, the VRMX control circuit 694, the A/D converter 695, and the detection/determination circuit 696 may be a motor controller within a single microcomputer, or may be provided as individual motor controllers and operated by a single microcomputer or a plurality of microcomputers.

The phase control circuit 691 controls a series of phases including the output of driving pulses and the generation of charge pulses (detection pulses). The driving pulse generating circuit 692 outputs driving pulses to the motor, and the charge pulse generating circuit 693 outputs the charge pulses (described in detail later) to the motor. The VRMX control circuit 694 controls the VRMX 67 to generate a prescribed source voltage. The A/D converter 695 converts an analog voltage at a prescribed location of the driving circuit 5 (described in detail later) into a digital signal. The detection/determination circuit 696 determines whether or not the stepping motors 4 have rotated on the basis of the digital signal.

(Stepping Motor 4)

Figure 3:
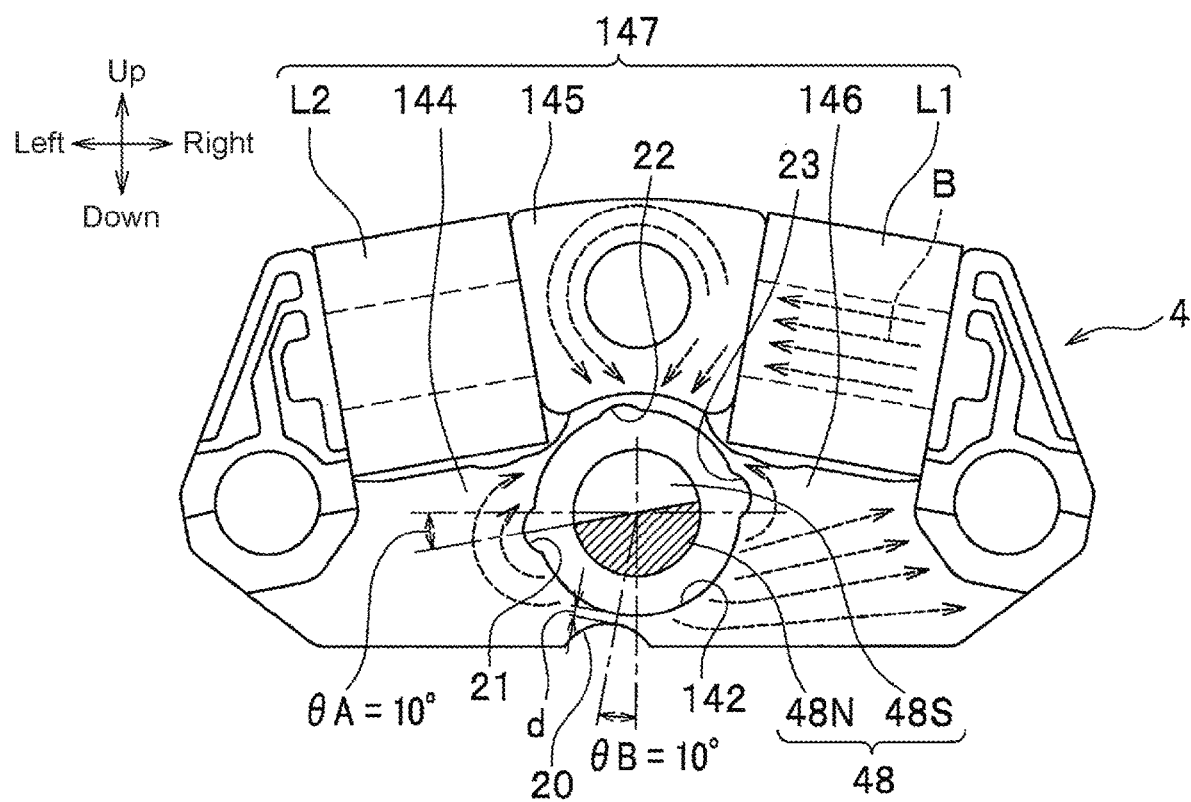
FIG. 3 is a plan view of a stepping motor.

FIG. 3 is a plan view of the stepping motor 4.

The stepping motor 4 includes a stator 147 and a rotor 48. The rotor 48 is formed having a disk shape and is supported so as to be capable of rotating in a rotation direction, and includes a magnet bipolarized in a radial direction. In the rotor 48, the hatched part corresponds to an N pole 48N, whereas the unhatched part corresponds to an S pole 48S. A magnet such as a rare earth magnet (a samarium cobalt magnet, for example) can be used favorably as the rotor 48, but the rotor 48 is not limited thereto.

The rotor 48 is disposed so as to be capable of rotating central to a shaft (not illustrated) provided in the stator 147. Note that in the present embodiment, the rotor 48 can rotate counter-clockwise or clockwise at a prescribed step angle in response to a driving pulse being applied to coils L1 and L2, which will be described later. The step angle is 180 degrees in the present embodiment. In the case where the stepping motor 4 is applied in a timepiece or the like, the rotor 48 is linked to gears constituting the corresponding gear train mechanism 3 for moving the corresponding hand 2 of the timepiece, for example. The rotation of the rotor 48 then causes those gears and the like to rotate.

The stator 147 includes a substantially rectangular center yoke 145, and a side yoke 146 (a first side yoke) and a side yoke 144 (a second side yoke) disposed below the center yoke 145. The side yokes 144 and 146 are provided with substantially bilateral symmetry so as to surround the rotor 48. The coils L1 (a first coil) and L2 (a second coil) are inserted between an upper end portion of the center yoke 145 and the side yokes 144 and 146, respectively. The coils L1 and L2 are connected to the driving circuit 5 (see FIG. 1) via a terminal block 143.

A substantially circular opening 142 is formed in the stator 147, at a point where a lower end of the center yoke 145 intersects with the pair of side yokes 144 and 146, and the rotor 48 is disposed in the opening 142. When magnetized, three magnetic poles are produced in the stator 147 along an outer circumference of the rotor 48: one near the center yoke 145, one near the side yoke 144, and one near the side yoke 146. When driving pulses are applied to the coils L1 and L2, the three magnetic poles of the stator 147 switch polarities. Meanwhile, a semicircular first recess 20 is formed below the opening 142 at the location where the side yokes 144 and 146 connect.

A connection area where the side yokes 144 and 146 are connected is an area located between the opening 142 and the first recess 20. When the thickness of this connection area is represented by d, a position where the thickness d is lowest (or where a minimum value for the thickness d appears) corresponds to a magnetic saturation position where magnetic saturation is produced. When viewed from the center of the rotor 48, the magnetic saturation position is formed in a position tilted clockwise by an angle θB relative to the direction of the center yoke 145 (the up-down direction in FIG. 3). This angle θB is called a "first angle" and is set to 10 degrees in the present embodiment.

One end of a core of the coil L1 is magnetically linked to the center yoke 145, and another end of the core of the coil L1 is magnetically linked to a free end of the side yoke 146. Likewise, one end of a core of the coil L2 is magnetically linked to the center yoke 145, and another end of the core of the coil L2 is magnetically linked to a free end of the side yoke 144.

In the present embodiment, the driving pulse generating circuit 692 (see FIG. 2) applies driving pulses to the coils L1 and L2. Magnetic fluxes arise in the coils L1 and L2 as a result, and the magnetic fluxes flow along the magnetic core of the coil L1 and the stator 147 magnetically linked thereto, switching the three magnetic poles as appropriate.

Three substantially semicircular inner recesses 21, 22, and 23 are formed in an inner circumferential surface of the opening 142. The inner recess 22 is slightly shallower than the other inner recesses 21 and 23. When viewed from the center of the rotor 48, the inner recess 21 (a second recess) is formed in a position tilted counter-clockwise by an angle θA relative to an extension direction of the side yokes 144 and 146 (the left-right direction in FIG. 3). This angle θA is called a "second angle" and is set to 10 degrees in the present embodiment. The inner recess 22 is formed in a position 90 degrees clockwise from the inner recess 21, and the inner recess 23 (a third recess) is formed in a position 180 degrees clockwise from the inner recess 21. The rotor 48 can be kept in a static state by these three inner recesses 21, 22, and 23.

In the present embodiment, the stepping motor 4 has the highest index torque (holding torque) in a state where the polarization direction of the rotor 48 opposes directions tilted approximately 80 degrees and approximately 260 degrees clockwise from the direction of the center yoke 145 (the up-down direction in FIG. 3). As such, in a de-energized state, that is, when no driving pulse is being applied, the rotor 48 magnetically stabilizes and stops at the stopped position illustrated in FIG. 3 or a stopped position rotated 180 degrees from that stopped position. The densities of the magnetic fluxes arising in each part of the stator 147 while the coils L1 and L2 are in the de-energized state are indicated by densities of the broken line arrows B in FIG. 3.

As illustrated in FIG. 3, when the rotor 48 is in a stopped state, much of the magnetic flux arising from the rotor 48 passes through the coil L1 via the side yoke 146 and then returns to the rotor 48 via the center yoke 145. Part of the magnetic flux furthermore returns to the rotor 48 from the side yoke 144 via the coil L2.

(Driving Circuit 5)

Figure 4:
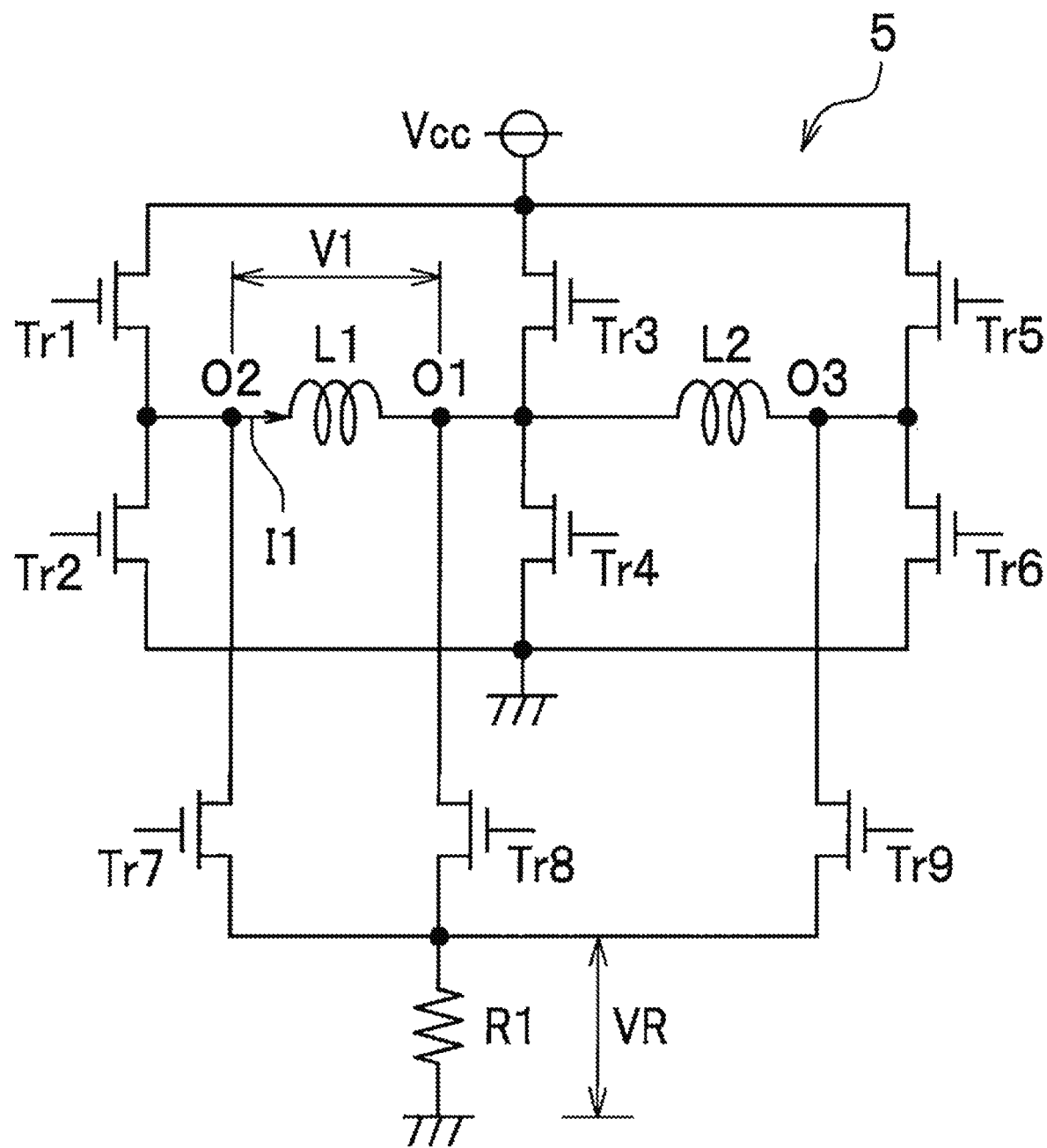
FIG. 4 is a circuit diagram illustrating a driving circuit.

FIG. 4 is a circuit diagram illustrating the driving circuit 5.

The driving circuit 5 applies driving pulses to the two coils L1 and L2 and applies the charge pulse to the coil L1. The driving circuit 5 includes an H-bridge circuit constituted by switch elements Tr1 to Tr6, which are Metal-Oxide-Semiconductor Field-Effect Transistors (MOSFETs). Meanwhile, switch elements Tr7 to Tr9 and a resistor R1 constitute a discharge circuit that discharges energy stored in the coils L1 and L2. A current flowing in the coil L1 will be called coil current I1, and a terminal voltage of the coil L1 will be called a coil voltage V1.

The power source 7 (see FIG. 1) applies a source voltage Vcc across a source terminal and a ground terminal of the driving circuit 5. Between a voltage terminal and the ground terminal, the switch elements Tr1 and Tr2 are connected in series via a connection point O2, the switch elements Tr3 and Tr4 are connected in series via a connection point O1, and the switch elements Tr5 and Tr6 are connected in series via a connection point O3. One end of the resistor R1 is connected to the ground terminal. The switch element Tr7 is connected between the connection point O2 and the other end of the resistor R1. The switch element Tr8 is connected between the connection point O1 and the other end of the resistor R1. The switch element Tr9 is connected between the connection point O3 and the other end of the resistor R1. Furthermore, the coil L1 of the stepping motor 4 is connected between the connection points O2 and O1, and the coil L2 is connected between the connection points O3 and O1.

Operations in Embodiment (Operations in Each Phase)

Figure 5A:
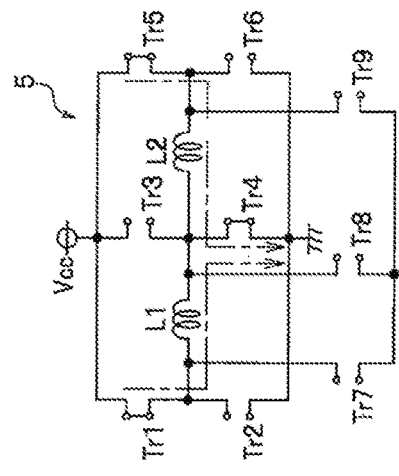
FIG. 5A is a descriptive diagram illustrating operations in a first driving phase of a driving circuit.
Figure 5B:
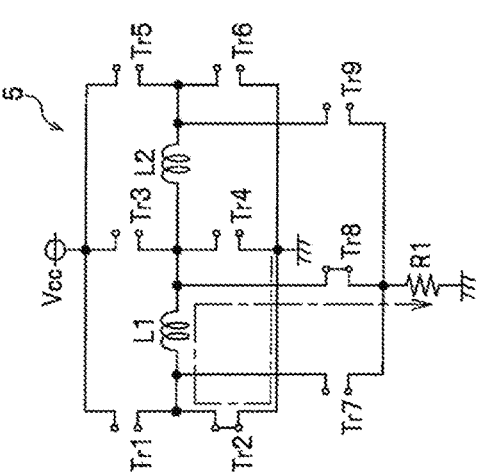
FIG. 5B is a descriptive diagram illustrating operations in a second driving phase and a charge phase.
Figure 5C:
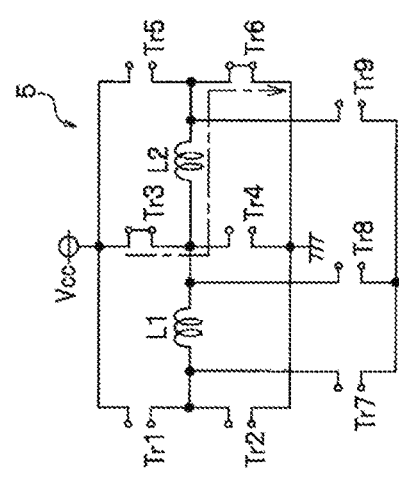
FIG. 5C is a descriptive diagram illustrating operations in a third driving phase.
Figure 5D:
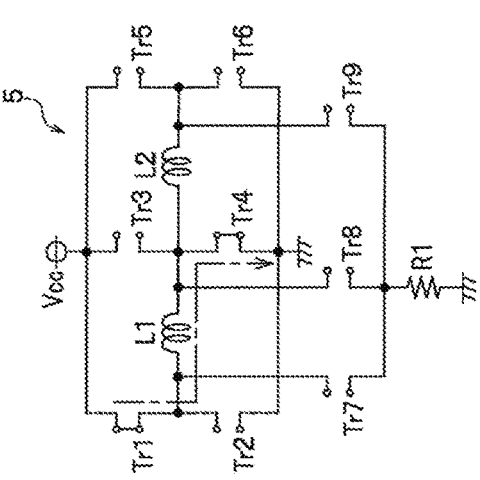
FIG. 5D is a descriptive diagram illustrating operations in a current detection phase.

Next, operations according to the present embodiment will be described with reference to FIGS. 5A to 5D. Here, FIGS. 5A to 5D are descriptive diagrams illustrating operations in a first driving phase of the driving circuit, as shown in FIG. 5A; in a second driving phase and a charge phase, as shown in FIG. 5B; in a third driving phase, as shown in FIG. 5C; and in a current detection phase, as shown in FIG. 5D. Note that the third driving phase illustrated in FIG. 5C is applied when reversing the stepping motor 4.

FIGS. 5A to 5D illustrate current flowing in the driving circuit 5 in a period in which the rotor 48 rotates 180 degrees from a given step angle to the next step angle. In these diagrams, the symbols for the switch elements Tr1 to Tr9 are indicated as terminal pairs. A switch element in an on state is indicated by the pair of terminals being in a strapped state, whereas a switch element in an off state is indicated by the pair of terminals being in an open state.

The first driving phase, the second driving phase, the charge phase, and the current detection phase are executed in sequence in a period in which the rotor 48 rotates forward by 180 degrees.

First, in the first driving phase, the driving pulse generating circuit 692 turns the switch elements Tr3 and Tr6 on and turns the other switch elements off, as illustrated in FIG. 5A. As a result, current flows to the coil L2 along a path traversing the switch elements Tr3 and Tr6. In a normal state, the rotor 48 is rotationally driven approximately 90 degrees. Incidentally, when the switch elements aside from the switch elements Tr3 and Tr6 are turned off in this manner, the coil L1 enters a high-impedance state.

Next, in the second driving phase, the driving pulse generating circuit 692 turns the switch elements Tr1 and Tr4 on and turns the other switch elements off, as illustrated in FIG. 5B. As a result, current flows to the coil L1 along a path traversing the switch elements Tr1 and Tr4. In a normal state, the rotor 48 is rotationally driven approximately 90 additional degrees (a total of 180 degrees). Incidentally, when the switch elements aside from the switch elements Tr1 and Tr4 are turned off in this manner, the coil L2 enters a high-impedance state.

In the case where the stepping motor 4 is rotated forward, the third driving phase is not employed, and thus the next phase is the charge phase. The charge pulse generating circuit 693 turns the switch elements Tr1 and Tr4 on for a short amount of time and turns the other switch elements off again, as illustrated in FIG. 5B. Incidentally, when the switch elements aside from the switch elements Tr1 and Tr4 are turned off in this manner, the coil L2 enters a high-impedance state.

During the driving, the pulsewidth in the first driving phase during forward rotation is 0.5 milliseconds, and the pulsewidth in the second driving phase is 2.5 milliseconds. As opposed to this, the width of the charge pulse (i.e., the detection pulse) in the charge phase is preferably in a range from greater than or equal to 0.01 milliseconds to less than or equal to 0.25 milliseconds, and more preferably in a range from greater than or equal to 0.05 milliseconds to less than or equal to 0.1 milliseconds. In terms of a relative relationship with the pulsewidth in the first driving phase (time t1 to t2), the width of the charge pulse is preferably in a range from ½ to ⅟500 the width of the driving pulse, and more preferably in a range from ⅟20 to ⅟50. The reasoning behind these numerical values is that the accuracy of the rotation detection will worsen if the charge pulse is too short, whereas the rotor 48 will move if the charge pulse is too long.

As described above, the width of the charge pulse is a short amount of time. Thus although the rotor 48 is not driven, the coil L1 is charged with magnetic energy. As illustrated in FIG. 5A, the resistor R1 being separated from the current path during the charge phase is one characteristic of the present embodiment. As a result, almost all of the energy supplied from the power source 7 (see FIG. 1) can be stored in the coil L1 as magnetic energy, which makes it possible to quickly charge the coil L1.

In the subsequent current detection phase, the charge pulse generating circuit 693 turns the switch elements Tr2 and Tr8 on and turns the other switch elements off, as illustrated in FIG. 5D, thus applying a detection pulse to the coil L1. Incidentally, when the switch elements aside from the switch elements Tr2 and Tr8 are turned off in this manner, the coil L2 enters a high-impedance state, which is state better suited to detecting whether or the rotor 48 has successfully rotated.

Then, due to the magnetic energy with which the coil L1 has been charged, current flows through the coil L1, the switch element Tr8, the resistor R1, and the switch element Tr2, and a terminal voltage proportional to the current value is produced at the resistor R1. The terminal voltage at the resistor R1 is called a "measurement voltage VR." The measurement voltage VR is converted into a digital signal by the A/D converter 695 illustrated in FIG. 2. The detection/determination circuit 696 determines whether or not the rotor 48 has successfully rotated on the basis of the measurement voltage VR. Note that in the case where the rotation has failed, the rotor 48 is rotated by applying a correction pulse similar to that used in the first and second driving phases. After the operations illustrated in FIGS. 5A, 5B, and 5D have ended, the driving pulse generating circuit 692 and the charge pulse generating circuit 693 supply current to the coils L1 and L2 in the direction opposite from that indicated in FIGS. 5A, 5B, and 5D during the period in which the rotor 48 rotates the remaining 180 degrees.

In the case where the stepping motor 4 is to be rotated in reverse by a prescribed pulse cycle, such as 32 pps, the third driving phase indicated in FIG. 5C is inserted after the second driving phase and the charge phase. In the third driving phase, the driving pulse generating circuit 692 turns the switch elements Tr1, Tr4, and Tr5 on and turns the other switch elements off. Upon doing so, current flows in both the coils L1 and L2, and the rotor 48 is rotationally driven in the reverse direction as a result. The pulsewidth in the first driving phase during reverse rotation is 0.5 milliseconds, the pulsewidth in the second driving phase is 2.5 milliseconds, and the pulsewidth in the third driving phase is 0.5 milliseconds.

A state in which the rotor 48 has been rotationally driven by 180 degrees is called "successful rotation" in both forward and reverse driving. However, the rotor 48 may not rotate completely if the electronic timepiece 1 experiences vibrations or an impact when the driving pulse is inputted. In this case, a state in which the rotor 48 moves toward the position where the rotor 48 will stop in a magnetically stable manner, but the position is a position before the rotation (0 degrees), is called "rotation failure."

(Operations when Rotation is Successful)

Next, operations carried out during successful rotation will be described with reference to FIGS. 6A to C.

FIG. 6A is a waveform diagram of the coil voltage V1 applied to the coil L1 by the driving circuit 5, where a driving pulse P1 is applied to the coil L1. Note that the voltage applied to the coil L2 in the second driving phase following thereafter is not illustrated. Upon the phase transiting to the charge phase after the second driving phase ends, the driving circuit 5 applies a charge pulse P2 to the coil L1 in a period from time t3 to t4.

FIG. 6B is a waveform diagram of the coil current I1 during successful rotation. In the case where rotation succeeds, the rise of the coil current I1 becomes slower in the charge phase from time t3 to t4, and a peak value of the coil current I1 has not reached a prescribed threshold Ith at the time when the current detection phase has started at time t4. The reason the rise of the coil current I1 becomes slower after time t3 will be described next.

FIG. 6C is a plan view of the stepping motor 4 when rotation is successful.

It is assumed that the rotor 48 is first stopped in the position indicated in FIG. 3. When rotation is successful, the rotor 48 stops at a position rotated 180 degrees, as illustrated in FIG. 6C. In this state, the charge pulse P2 is applied to the coil L1 in the direction where the left end of the coil L1 is at the N pole. In FIG. 6C, a magnetic flux B1 produced by the coil L1 is indicated by the solid lines, and a magnetic flux B2 produced by the rotor 48 is indicated by the broken lines. Although the stator 147 is narrower in the periphery of the first recess 20 and the periphery of the inner recess 23, the magnetic fluxes B1 and B2 are in a mutually-weakening relationship at these locations. As such, magnetic saturation has less influence on the stator 147, and the inductance of the coil L1 becomes comparatively high. As a result, the peak value of the coil current I1 becomes less than the threshold Ith in the current detection phase (from time t4 on), as illustrated in FIG. 6B.

(Operations When Rotation Fails)

Next, operations carried out when rotation fails will be described with reference to FIGS. 7A to 7C.

FIG. 7A is a waveform diagram of the coil voltage V1 applied to the coil L1 by the driving circuit 5, and is similar to the waveform indicated in FIG. 6A.

FIG. 7B is a waveform diagram of the coil current I1 when rotation fails. In the case where the rotation has failed, the rise of the coil current I1 becomes faster in the charge phase from time t3 to t4, and a peak value of the coil current I1 exceeds the prescribed threshold Ith at the time when the current detection phase has started at time t4. The reason the rise of the coil current I1 becomes faster after time t3 will be described next.

FIG. 7C is a plan view of the stepping motor 4 when rotation has failed.

It is assumed that the rotor 48 is first stopped in the position indicated in FIG. 3. If the rotation has failed, the rotor 48 returns to the position illustrated in FIG. 3, as indicated in FIG. 7C. When the charge pulse P2 is applied to the coil L1, the magnetic flux B1 produced by the coil L1 is indicated by the solid lines in FIG. 7C, and the magnetic flux B2 produced by the rotor 48 is indicated by the broken lines in FIG. 7C. Although the stator 147 is narrower in the periphery of the first recess 20 and the periphery of the inner recess 23, the magnetic fluxes B1 and B2 are in a mutually-strengthening relationship at these locations. As such, magnetic saturation has more influence on the stator 147, and the inductance of the coil L1 becomes comparatively low. As a result, the peak value of the coil current I1 exceeds the threshold Ith in the current detection phase (from time t4 on), as illustrated in FIG. 7B.

In this manner, whether rotation has succeeded or failed can be determined on the basis of whether or not the peak value of the coil current I1 exceeds the threshold Ith. In practice, the above-described detection/determination circuit 696 determines whether rotation has succeeded or failed on the basis of whether or not the peak value of the measurement voltage VR (=R×I1), which is the terminal voltage at the resistor R1, has exceeded a threshold voltage Vth (=R×Ith).

Comparison Examples

Next, comparison examples for the present embodiment will be described in order to clarify the effects of the present embodiment.

FIGS. 8A to 8D are plan views of stepping motors according to Comparison Examples 1 to 4. Compared to the stepping motor 4 according to the embodiment (see FIG. 3), these stepping motors have different second angles θA and/or first angles θB.

The characteristics of the measurement voltage VR are illustrated in FIGS. 9A to 9D for Comparison Examples 1 to 4, and in FIG. 9E for the present embodiment. FIGS. 9A to 9E all indicate two threshold voltages Vth1 and Vth2. These indicate a maximum value and a minimum value of a range in which the threshold voltage Vth varies depending on component manufacturing error, environmental temperature, and so on.

Additionally, a success measurement voltage Vs and a failure measurement voltage Vf are indicated as the measurement voltage VR. To accurately detect whether rotation has succeeded or failed in a variety of environments, preferably, a relationship is satisfied in which the failure measurement voltage Vf is higher than the threshold voltage Vth1 and the success measurement voltage Vs is lower than the threshold voltages Vth1 and Vth2.

Comparison Example 1

As illustrated in FIG. 8A, in the stepping motor according to Comparison Example 1, the second angle θA and the first angle θB are 0 degrees, and the stepping motor has a bilaterally symmetrical shape. As a result, the magnetic fluxes from the rotor 48 pass through the coils L1 and L2 equally in the stopped state. When the stepping motor according to Comparison Example 1 is driven at 32 pps, the pulsewidth in the first driving phase is 0.5 milliseconds and the pulsewidth in the second driving phase is 2.5 milliseconds, in both forward and reverse rotation. The third driving phase is unnecessary in both forward and reverse rotation. Thus, when simply considering "driving" alone, Comparison Example 1 is advantageous in that the pulsewidth is short in both forward and reverse rotation, and power consumption can be suppressed as a result.

However, according to Comparison Example 1, it may be difficult to accurately detect whether the rotation has succeeded or failed depending on component manufacturing error, environmental temperature, and so on. A relationship between the threshold voltages Vth1 and Vth2, the success measurement voltage Vs, and the failure measurement voltage Vf in Comparison Example 1 is as indicated in FIG. 9A. As illustrated in FIG. 9A, the failure measurement voltage Vf is lower than the threshold voltage Vth1, and thus there are cases where it is not possible to accurately detect whether rotation has succeeded or failed.

Note that the characteristics of the voltages Vs and Vf can be shifted in the up-down direction in FIG. 9A by varying the resistance value of the resistor R1 (see FIG. 4). However, if the voltages Vs and Vf are shifted such that the failure measurement voltage Vf exceeds the threshold voltage Vth1, the success measurement voltage Vs will exceed the threshold voltage Vth2, and there will still be situations where it is not possible to accurately detect whether the rotation has succeeded or failed.

Comparison Example 2

In the stepping motor according to Comparison Example 2, the second angle θA is 15 degrees and the first angle θB is 0 degrees, as illustrated in FIG. 8B. Accordingly, the magnetic fluxes from the rotor 48 flow more to the coil L1 than to the coil L2. When the stepping motor according to Comparison Example 2 is driven at 32 pps, the pulsewidth in the first driving phase is 0.5 milliseconds, the pulsewidth in the second driving phase is 2.5 milliseconds, and the third driving phase is unnecessary, during forward rotation. Meanwhile, the pulsewidth in the first driving phase is 0.5 milliseconds, the pulsewidth in the second driving phase is 2.5 milliseconds, and the pulsewidth in the third driving phase is 0.75 milliseconds, during reverse rotation. The stepping motor is driven in reverse less frequently than forward, and thus Comparison Example 2 can achieve essentially the same power consumption as Comparison Example 1.

However, even with Comparison Example 2, there are cases where it is difficult to accurately detect whether the rotation has succeeded or failed. A relationship between the threshold voltages Vth1 and Vth2 and the voltages Vs and Vf in Comparison Example 2 is as indicated in FIG. 9B. As illustrated in FIG. 9B, the failure measurement voltage Vf is lower than the threshold voltage Vth1, and thus there are cases where it cannot be accurately detected whether rotation has succeeded or failed.

Comparison Example 3

In the stepping motor according to Comparison Example 3, the second angle θA is 0 degrees, and the first angle θB is 15 degrees, as illustrated in FIG. 8C. Accordingly, the magnetic fluxes from the rotor 48 flow more to the coil L1 than to the coil L2. When the stepping motor according to Comparison Example 3 is driven at 32 pps, the pulsewidths in the first to third driving phases are the same as in the above-described Comparison Example 2 during forward and reverse rotation, and thus Comparison Example 3 can achieve almost the same power consumption as Comparison Example 1.

However, even with Comparison Example 3, there are cases where it is difficult to accurately detect whether the rotation has succeeded or failed. A relationship between the threshold voltages Vth1 and Vth2 and the voltages Vs and Vf in Comparison Example 3 is as indicated in FIG. 9C. As illustrated in FIG. 9C, the failure measurement voltage Vf is not sufficiently higher than the threshold voltage Vth1, and thus there are cases where it is not possible to accurately detect whether rotation has succeeded or failed.

Comparison Example 4

Here, an example in which the stepping motor according to Comparison Example 4 is driven at 200 pps will be described in order to clarify the difference between the present embodiment and Comparison Example 4.

In the stepping motor according to Comparison Example 4, the second angle θA is 15 degrees, and the first angle θB is 15 degrees, as illustrated in FIG. 8D. Accordingly, magnetic fluxes from the rotor 48 flow mostly to the coil L1 and almost not at all to the coil L2. When the stepping motor according to Comparison Example 4 is driven at 200 pps, the pulsewidth in the first driving phase is 0.5 milliseconds, the pulsewidth in the second driving phase is 2.5 milliseconds, and the third driving phase is unnecessary, during forward rotation. Meanwhile, the pulsewidth in the first driving phase is 0.5 milliseconds, the pulsewidth in the second driving phase is 2.0 milliseconds, and the pulsewidth in the third driving phase is 1.5 milliseconds, during reverse rotation. The stepping motor is driven in reverse less frequently than forward, and thus Comparison Example 4 can achieve essentially the same power consumption as Comparison Example 1.

A relationship between the threshold voltages Vth1 and Vth2 and the voltages Vs and Vf in Comparison Example 4 is as indicated in FIG. 9D. In Comparison Example 4, the failure measurement voltage Vf is sufficiently higher than the threshold voltage Vth1, and the success measurement voltage Vs is sufficiently lower than the threshold voltage Vth2. Thus, according to Comparison Example 4, whether the rotation has succeeded or failed can be detected accurately. Although the term "Comparison Example" is used here, Comparison Example 4 is one of the preferred embodiments of the present invention because of its unique structure and accurate rotation detection ability.

However, according to Comparison Example 4, which is an embodiment of the present invention, there are situations where it is necessary to slow the rotation speed during reverse rotation. In the case where the stepping motor is rotated at 200 pps, the total time of the pulsewidths in the first to third driving phases in theory cannot exceed 5 milliseconds. According to Comparison Example 4, during reverse rotation, the total of the pulsewidths in the first to third driving phases in 4 milliseconds (0.5+2.0+1.5), and there is thus a difference of 1 millisecond from the theoretical maximum value (5 milliseconds). However, in the case where the microcomputer 6 is a low power-consumption consumer product, it can be difficult to carry out various other processes during that period of 1 millisecond. In other words, depending on various conditions, it may be necessary to reduce the rotation speed during reverse rotation to a slower speed than 200 pps. Furthermore, with the stepping motor according to Comparison Example 4, the power consumed in the third driving phase during reverse rotation increases by twice or more compared to the stepping motor according to the other disclosed embodiments of the present embodiment.

Effects of Embodiment

As described thus far, the stepping motor 4 according to the present embodiment includes a rotor (48) and a stator (147) having an opening (142) that contains the rotor (48), a first side yoke (146) extending from the opening (142) in a first direction (right), a second side yoke (144) extending from the opening (142) in a second direction (left) that is the direction opposite from the first direction (right), and one or more coils magnetically connected to the first side yoke (146) or the second side yoke (144). A first recess (20) is formed in an outer circumference of the stator (147) such that when a direction orthogonal to the first direction (right) and the second direction (left) is taken as a third direction (down), a magnetic saturation position is formed at a position rotated toward the second direction (left) from the third direction (down) by a prescribed first angle (θB) greater than zero; and a second recess (21) that determines a stable resting position of the rotor (48) is formed at a position rotated toward the third direction (down) from the second direction (left) by a prescribed second angle (θA) greater than zero.

Additionally, the stator (147) further includes a center yoke (145) extending from the opening (142) in a fourth direction (up) that is the direction opposite from the third direction (down). The one or more coils include a first coil (L1) inserted between the center yoke (145) and the first side yoke (146), and a second coil (L1) inserted between the center yoke (145) and the second side yoke (144). A third recess (23) that determines the stable resting position of the rotor (48) with the second recess (21) is formed in the stator (147), at a position opposite from the second recess (21) with the rotor (48) located between the second recess (21) and the third recess (23). Furthermore, the first angle (θB) is an angle within a range of 6 degrees to 14 degrees, and the second angle (θA) is an angle within a range of 6 degrees to 14 degrees.

According to these features, the failure measurement voltage Vf can be made sufficiently higher than the threshold voltage Vth1, and the success measurement voltage Vs can be made sufficiently lower than the threshold voltage Vth2, as illustrated in FIG. 9E. Thus, it is possible to accurately detect whether rotation has succeeded or failed. Additionally, when the stepping motor 4 is driven in reverse at 32 pps, the total time of the pulsewidths in the first to third driving phases is 3 milliseconds (0.5+2.0+0.5), and thus a difference of 28.25 milliseconds from the theoretical maximum value (31.25 milliseconds) can be ensured. This provides sufficient leeway for other various processes to be executed.

Modification Examples

The present invention is not intended to be limited to the embodiments described above, and many other modification examples can be made thereon. The embodiments described above are merely examples given to facilitate understanding of the present invention, and the present invention is not limited to a configuration including all of the elements described above. Additionally, configurations in one embodiment can be partially replaced with configurations from another embodiment, and likewise configurations from one embodiment can be added to the configurations of another embodiment. Furthermore, some configurations in a given embodiment can be omitted, or other configurations can be added and replace those configurations. The following are some possible variations that can be made on the embodiments described above.

(1) The foregoing embodiment describes the stepping motor 4 and the microcomputer 6 as being installed in the electronic timepiece 1, but these elements may be applied in various other devices aside from the electronic timepiece 1.

(2) The foregoing embodiment describes the second angle θA and the first angle θB as both being 10 degrees, but the angles θA and θB are not limited to 10 degrees. In other words, the same effects as those described in the foregoing embodiment will be achieved as long as the angles θA and θB are within a range of 6 to 14 degrees. A drawback in that the rotation speed during reverse rotation will unavoidable slow down, as in the above-described Comparison Example 4, for example, may arise if the angles θA and θB exceed the range of 6 to 14 degrees. However, a configuration in which the angles θA and θB exceed the range of 6 to 14 degrees may be applied if this drawback does not pose any problems.

(3) The foregoing embodiment describes an example in which the polarity of the driving pulse P1 and the polarity of the charge pulse P2 are the same, but as indicated in FIG. 6A, both polarities may be reversed. Generally speaking, the rotation of a stepping motor is more likely to succeed than fail, and thus in the foregoing embodiment, the polarity of the charge pulse P2 is selected such that the coil current I1 when rotation succeeds (see FIG. 6B) is lower than the coil current I1 when rotation fails (see FIG. 7B). However, depending on the configuration of the stator 147, a situation in which the coil current I1 when rotation succeeds can arise more easily by reversing the polarities of the pulses P1 and P2.

(4) The foregoing embodiment may be applied in the detection of skew in a hand caused by drop impacts, static electricity, or the like.

In other words, after an instance of rotation detection, carrying out the same rotation detection multiple times before the next driving pulse is supplied makes it possible to determine whether or not the hand has become skewed. Thus, in the case where skew in the hand has been detected, that skew can be corrected by detecting the position of the hand and returning the hand to its normal position. For example, after rotation is detected, the same rotation detection is carried out multiple times before the next driving pulse is supplied. In the case where it is determined that the rotation of the rotor 48 has failed even once, the hand may be determined to be skewed, and a pulse wave for correcting the position of the hand may be outputted. This makes it possible to install second, minute, and hour hands having high weights and unbalanced moments, which could not be installed conventionally.

(5) In the foregoing embodiment, the same rotation detection carried out multiple times at the timing of the current detection phase, and the rotation of the rotor 48 may be determined to have failed in the case where the rotation of the rotor 48 is detected to have failed even once. This makes it possible to reduce the rate of erroneous detections caused by the timing at which the rotation detection is carried out.

Additionally, in the stated multiple detections, a pulse having the opposite polarity from the charge pulse in the charge phase may be inserted after a specific number of detections have been carried out and before the next detection after that specific number. As a result, the influence that residual magnetic energy from the magnetic energy charged for the specific number of detections has on the next detection after that specific number can be reduced.

(6) In the foregoing embodiment, rotation detection may be carried out through a method of detecting back EMF (back-voltage) arising in the coil before the rotation detection carried out at the timing of the above-described current detection phase. In other words, after rotation detection is carried out through a method of detecting back EMF (back-voltage) arising in the coil, the rotation detection carried out at the timing of the above-described current detection phase may be carried out one or more times. This makes it possible to reduce the influence of the detection characteristics of the respective detection methods and achieve a more reliable rotation detection.

Figure 10:
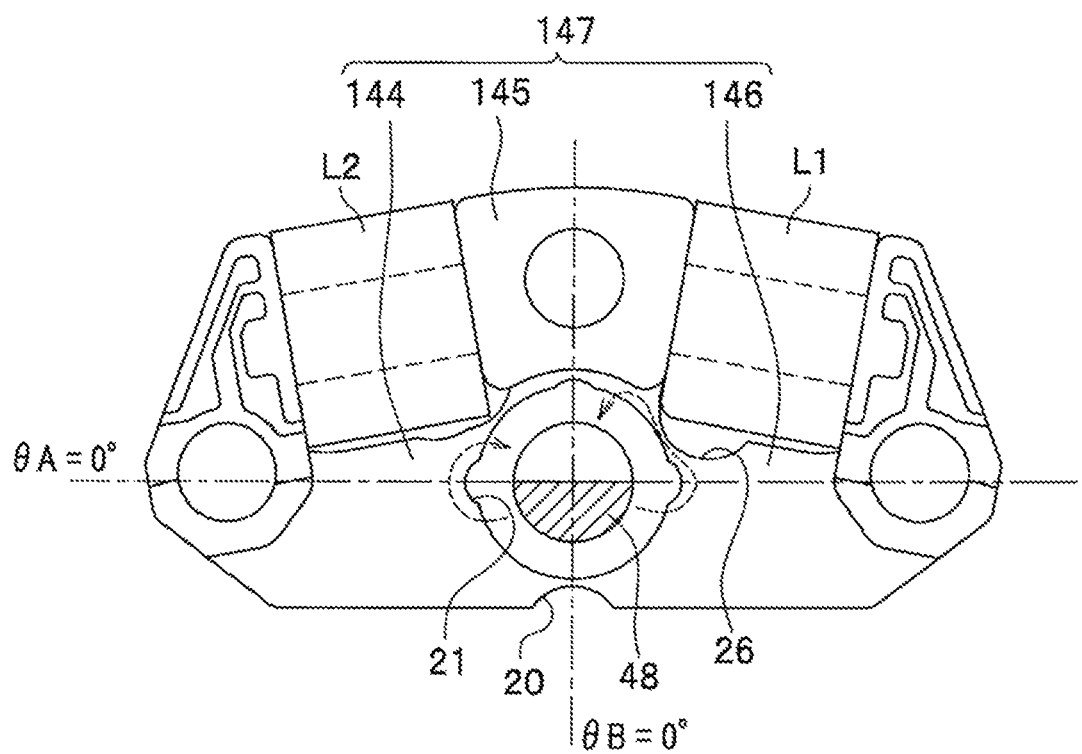
FIG. 10 is a plan view of a stepping motor according to a modification example of one embodiment of the present invention.

(7) The stepping motor 4 may be varied as indicated in FIG. 10. The form of the stepping motor illustrated in FIG. 10 is almost the same as that described in Comparison Example 1 (see FIG. 8A). However, a substantially semi-circular recess 26 is formed in the side yoke 146 at a location between the coil L1 and the rotor 48. In the present modification example, magnetic fluxes arising in the rotor 48 are indicated by the broken lines. The shape of the path of these magnetic fluxes is similar to the shape of the path of the magnetic flux B2 produced by the rotor 48 in the foregoing embodiment (see FIG. 7C). In this manner, the shapes of the side yokes 144 and 146 may be varied so as to shift the saturation position in one direction.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A stepping motor, comprising:
a rotor; and
a stator including a generally circular-shaped opening accommodating the rotor, a first side yoke extending from the opening generally in a right horizontal direction, a second side yoke extending from the opening generally in a left horizontal direction that is a direction opposite to the right horizontal direction, and one or a plurality of coils magnetically coupled to the first side yoke or the second side yoke, the stator having a generally line-symmetrical shape with respect to a vertical line passing a center of said opening,
wherein a first recess is formed in an outer bottom edge of the stator at a position that is angularly offset from the vertical line to the left by a prescribed first angle,
wherein an inner circumference of the stator that defines the opening in the stator has a second recess that determines a stable resting position of the rotor at a position that is angularly offset downwardly by a prescribed second angle from a horizontal line passing through the center of the opening perpendicularly to the vertical line,
wherein the first angle is an angle within a range of 6 degrees to 14 degrees, and
wherein the second angle is an angle within a range of 6 degrees to 14 degrees.

2. The stepping motor according to claim 1, wherein the position of the first recess defines a magnetic saturation position.

3. The stepping motor according to claim 2,
wherein the stator further includes a center yoke extending from the opening upwardly, and
wherein the one or plurality of coils include a first coil inserted between the center yoke and the first side yoke, and a second coil inserted between the center yoke and the second side yoke.

4. The stepping motor according to claim 3, wherein the first angle and the second angle are the same angle.

5. The stepping motor according to claim 2, wherein the first angle and the second angle are the same angle.

6. The stepping motor according to claim 1,
wherein the stator further includes a center yoke extending from the opening upwardly, and
wherein the one or plurality of coils include a first coil inserted between the center yoke and the first side yoke, and a second coil inserted between the center yoke and the second side yoke.

7. The stepping motor according to claim 6,
wherein the second recess is formed in the second side yoke across from the rotor, and
wherein the inner circumference of the stator has a third recess that determines the stable resting position of the rotor along with the second recess in the first side yoke.

8. The stepping motor according to claim 7, wherein the third recess is positioned opposite to the second recess about the center of the opening.

9. The stepping motor according to claim 8, wherein the first angle and the second angle are the same angle.

10. The stepping motor according to claim 7, wherein the first angle and the second angle are the same angle.

11. The stepping motor according to claim 6, wherein the first angle and the second angle are approximately the same angle.

12. The stepping motor according to claim 1, wherein the first angle and the second angle are the same angle.

13. A rotation detecting apparatus, comprising:
the stepping motor according to claim 1; and
a motor controller that detects a value of current flowing in at least one of the one or plurality of coils of the stepping motor and determines whether or not the rotor has rotated to a target rotational position,
wherein the motor controller:
outputs a detection pulse to said at least one of the one or plurality of coils for detecting the value of the current flowing in said at least one of the one or plurality of coils, the value of the current depending upon a stopping angle of the rotor,
detects the value of the current flowing in said one of the one or plurality of coils that is generated in response to the detection pulse, and
determines whether or not the rotor has rotated to the target rotational position in accordance with the detected value of the current flowing in said at least one of the one or plurality of coils.

14. The rotation detecting apparatus according to claim 13, wherein the motor controller:
determines whether or not the rotor has rotated to the target rotational position by comparing a threshold of the same polarity as the detection pulse with the detected value of the current flowing in said at least one of the one or plurality of coils; and
when the detected value of the current flowing in said at least one of the one or plurality of coils exceeds the threshold, determines that the rotor has not rotated to the target rotational position, and when the detected value of the current flowing in said at least one of the one or plurality of coils does not exceed the threshold, determines that the rotor has rotated to the target rotational position.

15. An electronic timepiece, comprising:
the stepping motor according to claim 1;
a hand;
a timing unit that measures time; and
a controller that controls driving of the stepping motor to cause the time measured by the timing unit to be specified to the hand.

* * * * *

UNITED STATES PATENT AND TRADEMARK OFFICE
CERTIFICATE OF CORRECTION

PATENT NO. : 10,620,588 B2  
APPLICATION NO. : 15/667370  
DATED : April 14, 2020  
INVENTOR(S) : Yuta Saito Page 1 of 1

It is certified that error appears in the above-identified patent and that said Letters Patent is hereby corrected as shown below:

In the Claims

Column 17, Line 33, In Claim 11, the text "are approximately the same" should be changed to -- are the same --.

Signed and Sealed this  
Second Day of June, 2020

Andrei Iancu  
*Director of the United States Patent and Trademark Office*